United States Patent [19]

Plummer

[11] 4,157,216

[45] Jun. 5, 1979

[54] ADAPTER FOR OPTICALLY COUPLING A PHOTOGRAPHIC CAMERA WITH A VIEWING DEVICE

[75] Inventor: William T. Plummer, Concord, Mass.

[73] Assignee: Polaroid Corporation, Cambridge, Mass.

[21] Appl. No.: 918,779

[22] Filed: Jun. 26, 1978

[51] Int. Cl.² .................. G03B 29/00; G03B 17/48; A61B 1/06

[52] U.S. Cl. .................................. 354/62; 128/6; 354/79

[58] Field of Search .............. 354/62, 79; 128/4, 6, 128/8, 9; 350/19; 355/18, 39

[56] References Cited

U.S. PATENT DOCUMENTS

| | | | |
|---|---|---|---|
| 1,573,401 | 2/1926 | Heine | 354/79 X |
| 2,974,573 | 3/1961 | Faasch | 354/79 X |
| 3,266,369 | 8/1966 | Waidelich | 350/229 |
| 3,548,808 | 12/1970 | Takahashi et al. | 128/6 |
| 3,556,085 | 1/1971 | Takahashi | 128/6 |
| 3,817,635 | 6/1974 | Kawahara | 128/6 X |
| 3,900,021 | 8/1975 | Makepeace et al. | 128/4 |
| 3,914,032 | 10/1975 | Takano et al. | 354/62 X |
| 3,994,288 | 11/1976 | Stumpf | 128/6 |
| 4,013,347 | 3/1977 | Nakamura | 350/188 |
| 4,035,068 | 7/1977 | Rawson | 350/188 X |
| 4,036,218 | 7/1977 | Yamashita et al. | 128/4 |

OTHER PUBLICATIONS

The Journal of Photographic Science, 1955, vol. 3, pp. 1-4.
Leica Photography, 1964, vol. 17, No. 1, pp. 12-15.

Primary Examiner—Donald A. Griffin
Attorney, Agent, or Firm—Francis A. Caufield

[57] ABSTRACT

An optical adapter is provided by which an image formed by the eyepiece of an optical viewing device such as an endoscope can be simultaneously viewed and photographed with a motion picture camera of the type having a through-the-lens viewing system which has an entrance pupil that occupies only a portion of the entrance pupil of the camera's optical taking system and which is positioned off the optical axis of the camera's optical taking system. The adapter operates to spread the optical viewing device's exit pupil so that its size matches that of the camera's entrance pupil and to improve the uniformity of illumination of the camera's viewing system and taking system.

5 Claims, 5 Drawing Figures

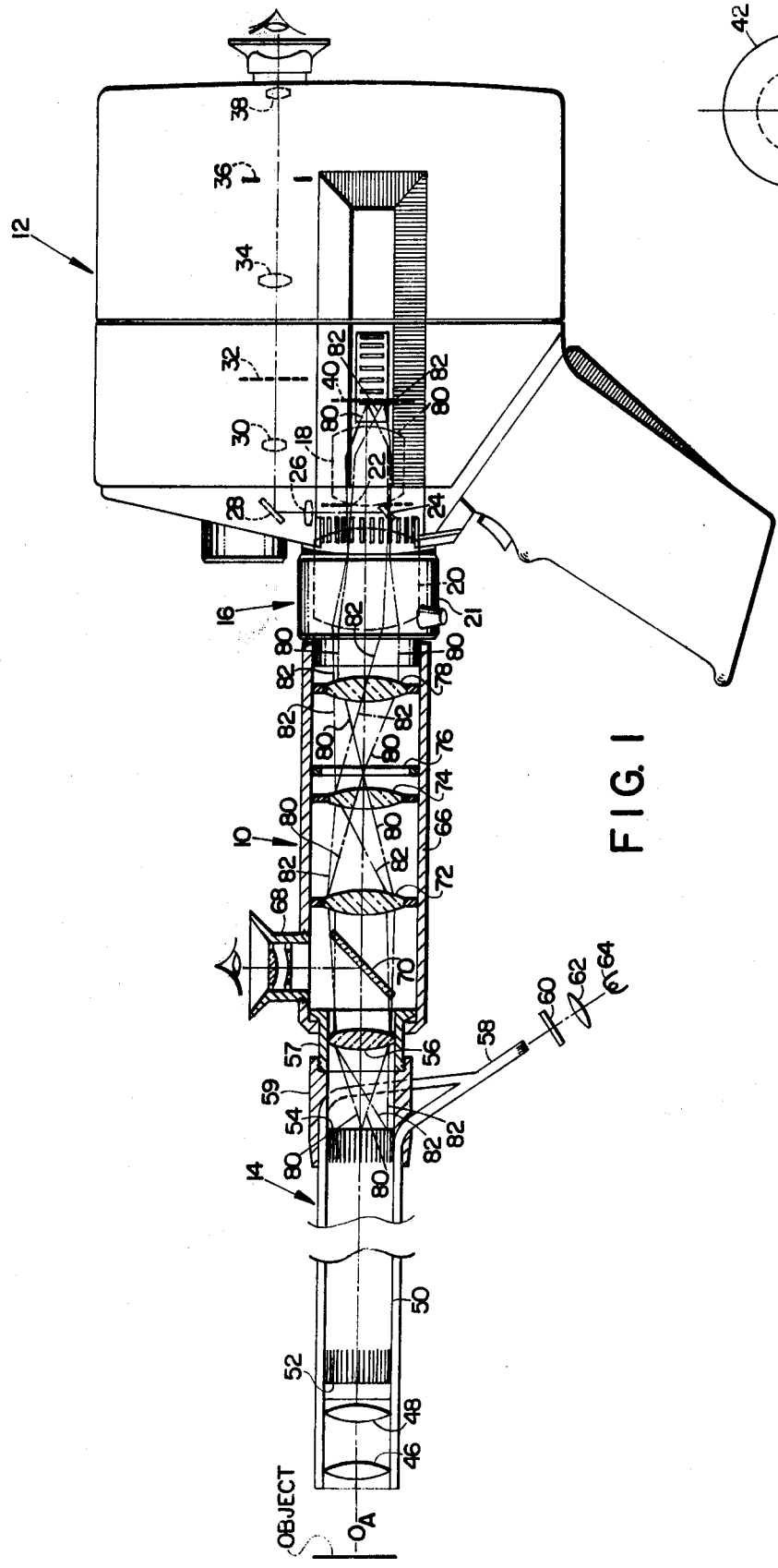
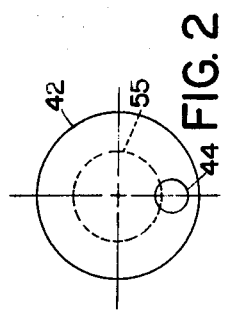
FIG. 1
FIG. 2

ADAPTER FOR OPTICALLY COUPLING A PHOTOGRAPHIC CAMERA WITH A VIEWING DEVICE

BACKGROUND OF THE INVENTION

1. Field of the Invention

This invention generally relates to photographic apparatus but more specifically to an optical adapter by which a photographic motion picture camera can be optically coupled to an endoscope to permit a clinician to simultaneously view and photograph, via the camera's optical system, the image formed by the endoscope's eye piece.

2. Description of the Prior Art

Endoscopes are well-known medical optical viewing devices which are useful in the diagnosis of disease. By providing a means for visually examining the interior of body organs for the presense of pathological processes, the endoscope can be used to confirm by direct observation what pathology may be suspected or indicated by other clinical and laboratory findings.

It is useful, and indeed, often desirable for the clinician conducting an endoscopic examination to have a permanent photographic record of his findings. For example, it should be apparent that such records can be used for teaching purposes, as a comparison for evaluating changes in the pathology, or as an aide for promoting communication between the examining clinician and others involved or interested in the diagnosis.

In spite of the obvious benefits which endoscopic photographs have, it should also be apparent that they should not be obtained where the patient's safety may be threatened or his discomfort may be added to by the process by which the photographs are obtained. Therefore, apparatus used for endoscopic photography must be easy to use, must not unduly prolong the endoscopic examination, must be mechanically and optically compatible with the particular endoscope chosen for the examination and must be capable of reliably producing photographs which are acceptably exposed and which contain adequate detail.

Providing photographic apparatus which satisfy these requirements can be difficult given the nature of the problems involved in endoscopic photography. For instance, the particular camera chosen must be able to focus on the image provided by the endoscope's eyepiece, adequate lighting must be provided, the clinician, and sometimes more than one, must be able to see the image immediately before and after the picture is taken in the case of stills and continuously for motion pictures, and all of this usually must be accomplished by apparatus which shares the endoscope's single optical path.

In the past, these problems have been dealt with in a variety of ways by providing either specially designed photographic systems whose use is limited to endoscopic photography or by providing adapters by which existing cameras can be used with an existing endoscope. For examples reference may be had to U.S. Pat. No. 3,368,643 issued to John E. Hotchkiss on Feb. 1, 1972 and entitled "Endoscope for Photographic Recording"; U.S. Pat. No. 3,918,072 issued to Toshihiro Imai et al on Nov. 4, 1975 and entitled "Single-Lens Reflex Optical System For An Endoscope"; U.S. Pat. No. 3,995,287 issued to Karl Storz on Nov. 30, 1976 and entitled "Endoscopic Camera"; and an article by Brian Stanford which appeared in *The Journal of Photographic Science,* volume 3, January 1955 and entitled "Theoretical First Principles of Endoscopic Photography".

However, none of the foregoing publications appear to deal directly with the specific problem with which the present invention is concerned. In particular, the primary object of the present invention is to provide an adapter by which a motion picture camera having a through-the-lens viewing system with an entrance pupil that occupies only a portion of its taking entrance pupil can be used with an optical viewing device such as an endoscope which has an exit pupil that is smaller in size than the camera's entrance pupil and still satisfy the requirement that the image formed by the viewing device's eyepiece can be viewed continuously while being photographed.

Other objects of the invention will in part be obvious and will in part appear hereinafter. The invention accordingly comprises the apparatus possessing the construction, combination of elements, and arrangement of parts which are exemplified in the following detailed disclosure.

SUMMARY OF THE INVENTION

This invention generally relates to photographic apparatus but more specifically to an adapter for use in optically coupling a photographic camera to the proximal end of an optical viewing such as an endoscope so that the image of an object formed by the optical viewing device can simultaneously be viewed and photographed. The camera is of the type which has a through-the-lens viewing system whose entrance pupil occupies only a portion of the camera's taking entrance pupil and which is laterally offset with respect to the optical axis of the camera's taking lens and the optical viewing device is of the type which has an eyepiece located at its proximal end for forming a collimated to nearly collimated object image and has an exit pupil smaller in size than the entrance pupil of the camera's optical system.

The adapter comprises a housing adapted to make a mechanical generally light-tight connection between the proximal end of the optical viewing device and the camera's objective taking lens.

Also included is a first relay lens, mounted in the housing in position to intercept light rays emerging from the optical viewing device's eyelens, for forming at a predetermined spatial location within the housing an aerial image of the object being viewed by the optical viewing device's optical system.

A second relay lens is provided and is mounted in the housing at a predetermined spaced distance from the first relay lens and adjacent the camera's objective taking lens for allowing the camera's objective lens to be focused on the aerial image formed by the first relay lens. The relay lenses are structured and spaced to image the optical viewing device's eyepiece onto the camera's entrance pupil.

Located within the housing in the plane in which the first relay lens forms the aerial image is a diffuser structured for spreading the optical viewing device's exit pupil so that it substantially matches the size of the camera's entrance pupil. The diffuser in combination with the relay lenses of the adapter operate to enhance the uniformity of the illumination in the camera's viewing path and taking path and to preclude vignetting of the entrance pupil of the camera's viewing system by optically spreading the optical viewing device's exit pupil to match its size with that of the camera's entrance pupil.

An important feature of a preferred embodiment is the provision of a field lens of larger size than the exit pupil of the optical viewing device and positioned in the housing between the first and second relay lenses for forming an image of the optical viewing device's exit pupil as seen through the first relay lens onto the entrance pupil of the camera as seen through the second relay lens. The field lens operates to redirect the chief rays from the bundle of rays forming the aerial image toward the optical axis of the second relay lens so that substantially all of the rays from the aerial image pass through the camera's entrance pupil.

DESCRIPTION OF THE DRAWINGS

The novel features that are considered characteristic of the invention are set forth with particularly in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

FIG. 1 is a side-elevational sectional view of the preferred embodiment of the adapter of the invention shown in combination with an endoscope and a movie camera;

FIG. 2 is a diagrammatic front view of the entrance pupils of the viewing system and the objective taking lens system of the camera of FIG. 1 showing how the exit pupil of the endoscope of FIG. 1 would be superimposed thereon without the adapter of the present invention.

DESCRIPTION OF THE PREFERRED EMBODIMENT

Figure 3:
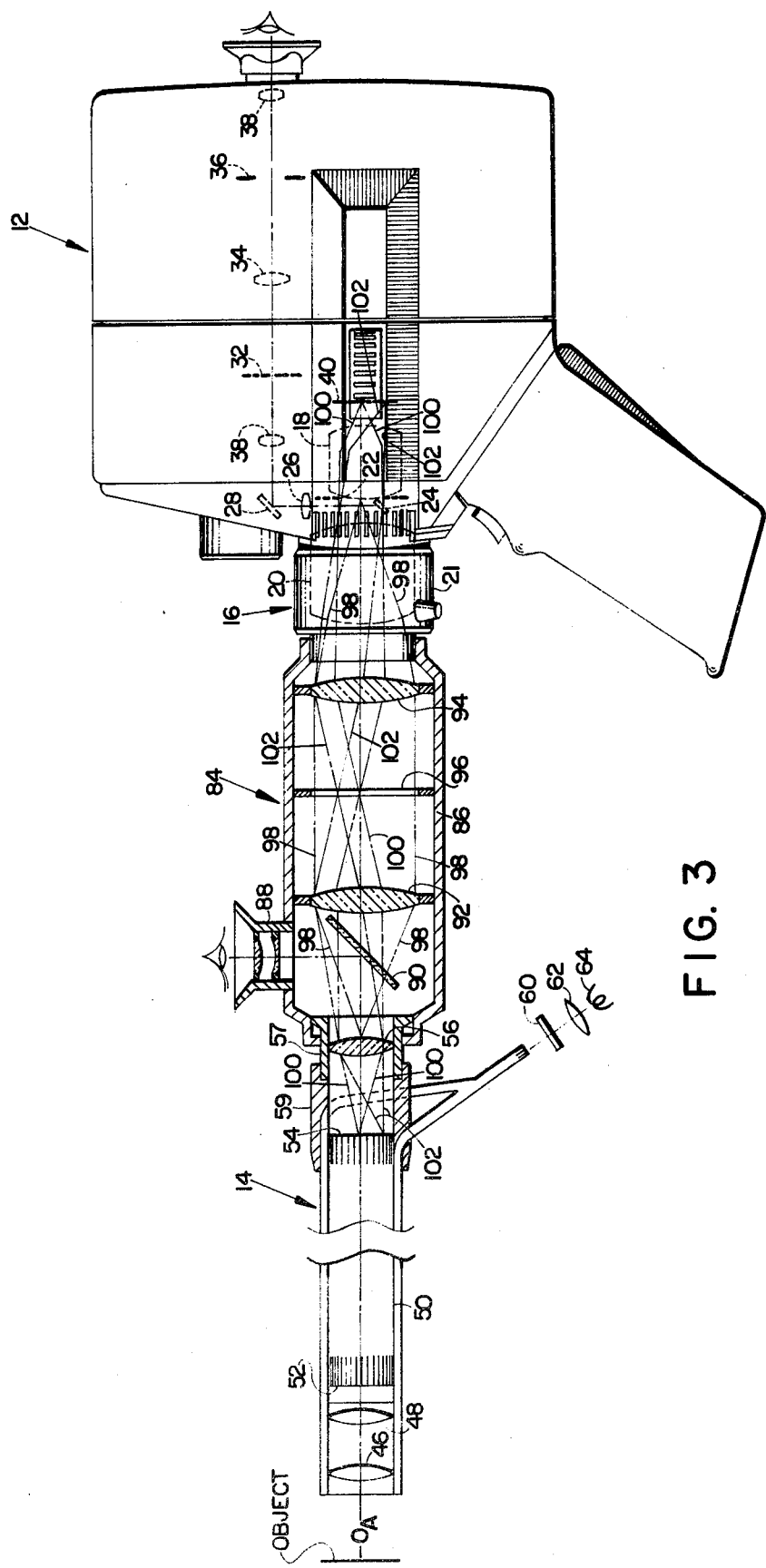
FIG. 3 is a side-elevational sectional view of an alternate embodiment of the invention shown in combination with the endoscope and camera of FIG. 1.

Referring now to FIG. 1, there is shown at 10 the preferred embodiment of the adapter of the invention by which a motion picture camera 12 is optically coupled with an optical viewing device such as the endoscope designated at 14.

The motion picture camera 12 may be any of a number of well-known types but, as illustrated, represents Polaroid Corporation's Polavision camera which is adapted in a well-known manner to accept instant color motion picture film which can be processed and viewed via a player (not shown) immediately after it has been exposed. The camera 12 includes an objective taking lens generally designated at 16 which comprises a prime lens 18 in combination with an afocal zoom lens 20. The camera 12 has an f/1.8 lens with a 2:1 zoom ratio and a two position switch (not shown) to allow selection between near and far focus ranges, the near focus being between 6 and 15 ft. and the far focus being between 15 ft. and infinity. The zoom portion of the objective taking lens 16 is adjusted by rotation of a lens barrel 21.

Provided in the camera 12 is a well-known through-the-lens viewing system which comprises a pick off mirror 24 which is located between the zoom lens 20 and the prime lens 18 and just below the optical axis of the objective taking lens 16. The pick off mirror 24 operates to intercept image forming rays which emerge from the rear surface of the zoom lens 20 and direct them along a folded optical path towards an objective lens 26 which functions as a relay. The optical path of the viewing system is then again folded by a second mirror 28 which directs light toward an erector lens 30. Located directly behind the erector lens 30 is an aperture stop 32 which is followed by a second erector lens 34 and then a field stop 36. Behind the field stop 36 is located an eyelens 38 by which a camera user may view an image of the scene formed by the other elements of the viewing system.

As illustrated diagrammatically in FIG. 2, the objective taking lens 16 has an entrance pupil designated by the circle 42 and the camera's viewing system has an entrance pupil designated by the circle 44. As is apparent, the entrance pupil 44 of the camera's viewing system occupies only a portion of the entrance pupil 42 of the camera's objective taking lens 16 and is also laterally offset with respect to the optical axis of the camera's taking lens 16.

The endoscope 14 constitutes an optical viewing device of the type which has a field of view which is larger than the diameter through which the field can be viewed and which is located several diameters away from the diameter through which the field can be viewed. As best shown in FIG. 1, the endoscope 14 comprises an objective lens consisting of a pair of spaced apart doublets 46 and 48 respectively, which, in combination, form a real image of an object on a distal end 52 of an elongated flexible fiber optic bundle 50. The image formed on the distal end 52 is then transferred in a well-known manner via the fiber optic bundle 50 to a proximal end 54 of the fiber optic bundle 50. In a collar 59, which surrounds and contains the proximal end of the fiber optic bundle 50, is a screw thread mount 57 in which is located an eyelens 56 for forming a collimated to nearly collimated image of the object which is located at the distal end of endoscope 14.

The object is illuminated via another fiber optic bundle 58 which receives light at its proximal end from a lamp 64, condenser lens 62 and a heat absorbing filter 60 which cools the light thereby keeping it at a comfortable temperature.

As best shown in FIG. 2, the endoscope 14 has an exit pupil 55 which is smaller in size than the entrance pupil of the camera's objective taking lens 16. Because of the difference in size between the endoscope's exit pupil 55, the camera's entrance pupil 42, and the size and location of the entrance pupil 44 of the camera's viewing system it would be extremely difficult for a photographer to simultaneously view and photograph the object image formed by the endoscope's eyelens 56 since the entrance pupil 44 of the camera's viewing system would be vignetted and therefore poorly illuminated. It is by way of the adapter 10 of the present invention that this problem is obviated, the adapter operating in a manner to be described to enhance the uniformity of the illumination in the camera's viewing path and taking path and to preclude vignetting of the entrance pupil 44 of the camera's viewing system by optically spreading the endoscope's exit pupil 55 to match its size with that of the camera's entrance pupil 42.

The adapter 10 includes a housing 66 that is adapted to make a mechanical, generally light-tight connection between the proximal end of the endoscope 14 and the camera's objective taking lens 16. This may be done in any well known manner by providing suitable attachment features between the screw mount 57 of the endoscope 14 and the forward end of the adapter 10 and between the objective taking lens 16 of the camera 12 and the rearward end of the adapter 10.

Mounted in the housing 66 immediately behind the eyelens 56 is a beamsplitter 70 which intersects the optical axis of the adapter 10 to provide a folded optical path along which the object image formed by the eyelens 56 may be observed independently of the camera's viewing system via a well known eyepiece 68. This feature allows two people to view what is being seen by the endoscope 14, one through the eyepiece 68 and the other via the camera's viewing system. If it is desired that the housing 66 be completely light-tight, a well known shutter arrangement can be provided to close off the folded optical path to the eyepiece 68.

A first relay lens 72 is mounted in the housing 66 in position to intercept light rays which emerge from the endoscope's eyelens 56. The relay lens 72 is structured to form at a predetermined spatial location within the housing 66 an aerial image of the object being viewed by the endoscope's optical system.

At a predetermined spaced distance from the relay lens 72, there is mounted in the housing 66 adjacent the camera's objective taking lens 16 a second relay lens 78 that is structured to allow the camera's objective taking lens 16 to be focused on the aerial image formed by the first relay lens 72.

Between the first relay lens 72 and the second relay lens 78 there is located in the housing 66 a field lens 74 whose size is larger than the exit pupil of the endoscope 14. The field lens 74 is structured in a well known manner to form an image of the endoscope's exit pupil 55 as seen through the first relay lens 72 onto the entrance pupil 42 of the camera 12 as seen through the second relay lens 78. Structured in this manner, the field lens 74 operates to redirect the chief rays from the bundle of rays which form the aerial image toward the optical axis of the second relay lens 78 so that substantially all of the rays from the aerial image pass through the camera's entrance pupil 42.

Positioned within the housing 66 at the focal plane in which the aerial image is formed by the first relay lens 72, there is located a diffuser 76 which is structured to spread the exit pupil 55 of the endoscope 14 so that it substantially matches the size of the camera's exit pupil 42 when imaged thereon by the field lens 74. The diffuser 76 in combination with the lenses of the adapter 10 operate to enhance the uniformity of the illumination in the camera's viewing path and taking path and to preclude vignetting of the entrance pupil 44 of the camera's viewing system by optically spreading the endoscope's exit pupil 55 to match its size with that of the camera's entrance pupil 42. In this regard, the diffuser 76 is structured in a well-known manner to spread out the aerial image formed by the first relay lens 72 over a predetermined and controlled angle which is made large enough so that the size of the endoscope's exit pupil 55 matches that of the camera's entrance pupil 42 without appreciably degrading the quality of the aerial image. The diffuser 76 is preferably structured of ground glass to produce a large number of small facets which refract incident light more or less randomly. Such glass may be etched in a hydrofluoric solution to reduce such diffusion to the degree needed.

FIG. 1 also illustrates diagrammatically the path which selected meridional rays take in traveling from the proximal end 54 of the fiber optic bundle 50 to a film plane 40 of the camera 12. Designated at 80 are a pair of meridional rays which have their origin at the endoscope's proximal end 54 and on-axis and which terminate on-axis at the camera's film plane 40, and designated at 82 are a pair of meridional rays which also have their origin at the endoscope's proximal end 54 but off-axis, and which terminate off-axis at the camera's film plane 40.

Structured in the foregoing manner, the adapter 10 optically couples the photographic camera 12 to the proximal end of an optical viewing device such as the endoscope 14 so that the image of an object formed by the optical viewing device can simultaneously be viewed and photographed.

ALTERNATE EMBODIMENT

Referring now to FIG. 3, there is shown an adapter 84 which is an alternate embodiment of the present invention. The camera 12 and the endoscope 14 are structured as previously described.

The adapter 84 comprises a housing 86 which, like the housing 66, is adapted to make a mechanical, generally light-tight connection between the proximal end of the endoscope 14 and the camera's objective taking lens 16.

A beamsplitter 90 is mounted within the housing 86 along the optical axis to, like the beamsplitter 70, provide a folded optical path along which the endoscope's field of view may be observed independently of the camera's viewing system via a well-known eyepiece 88.

Mounted in the housing 86 directly behind the beamsplitter 90 is a first relay lens 92 which is positioned to intercept light rays emerging from the endoscope's eyelens 56 and to form at a predetermined spatial location within the housing 86 an aerial image of the object being viewed by the endoscope's optical system.

Spaced behind the first relay lens 92 is a second relay lens 94 which is mounted in the housing 86 at a predetermined distance from the first relay lens 92 and adjacent the camera's objective taking lens 16. The second relay lens 94 is structured in a well-known manner to allow the camera's objective taking lens 16 to be focused on the aerial image formed by the first relay lens 92. Both of the relay lenses, 92 and 94, are structured and spaced to image the endoscope's eyelens 56 onto the camera's entrance pupil 42. Located within the housing 86 intermediate the relay lenses, 92 and 94, and at the focal plane of the first relay lens 92 is a diffuser 96. The diffuser 96 is structured in a well known manner to spread the endoscope's exit pupil 55 so that it substantially matches the size of the camera's entrance pupil 42. The diffuser 96, in combination with the relay lenses 92 and 94, operate to enhance the uniformity of the illumination in the camera's viewing path and taking path and to preclude vignetting of the entrance pupil of the camera's viewing system by optically spreading the endoscope's exit pupil 55 to match its size with that of the camera's entrance pupil 42.

Thus structured, the adapter 84 represents an alternate embodiment of the invention by which the camera 12 can be optically coupled to an optical viewing device such as the endoscope 14 so that the image of an object formed by the optical viewing device can simultaneously be viewed and photographed.

FIG. 3 also illustrates diagrammatically the path which selected meridional rays take in traveling from the proximal end 54 of the endoscope's fiber optic bundle 50 to the camera's film plane 40. Designated at 100, for example, are a pair of meridional rays which have their origin at the endoscope's proximal end 54 and on-axis and which terminate on-axis at the camera's film plane 40 and designated at 102 are a pair of meridional rays which also have their origin at the endoscope's proximal end 54, but off-axis, and which terminate off-axis at the camera's film plane 40. Also shown are a pair of meridional rays 98 which have their origin on the axis of the endoscope's eyelens 56 and terminate on-axis in the camera's aperture stop 22.

It will be readily apparent to those skilled in the art how to structure the various optical elements of both the adapters, 10 and 84, to provide their various functions as herein described. Moreover, certain changes may be made in the above-described embodiments without departing from the scope of the invention, and those skilled in the art may make still other changes according to the teachings of the present invention. Therefore, it is intended that all matter contained in the above description or shown in the accompanying drawings shall be interpreted as illustrative and not in a limiting sense.

What is claimed is:

1. An adapter for use in optically coupling a photographic camera to the proximal end of an optical viewing device such as an endoscope so that the image of an object formed by the optical viewing device can simultaneously be viewed and photographed, the camera being of the type which has a through-the-lens viewing system whose entrance pupil occupies only a portion of the camera's taking entrance pupil and which is laterally offset with respect to the optical axis of the camera's taking lens and the optical viewing device being of the type which has an eyepiece located at its proximal end for forming a collimated to nearly collimated object image and having an exit pupil smaller in size than the entrance pupil of the camera's optical system, said adapter comprising:

a housing adapted to make a mechanical generally light-tight connection between the proximal end of the optical viewing device and the camera's objective taking lens;

a first relay lens, mounted in said housing in position to intercept light rays emerging from the optical viewing device's eye lens, for forming at a predetermined spatial location within said housing an aerial image of the object being viewed by the optical viewing device's optical system;

a second relay lens mounted in said housing at a predetermined spaced distance from said first relay lens and adjacent the camera's objective taking lens for allowing said camera's objective lens to be focused on said aerial image, said relay lenses being structured and spaced to image the optical viewing device's eyepiece onto the camera's entrance pupil; and a diffuser located within said housing in the plane in which said aerial image is formed and structured for spreading the optical viewing device's exit pupil so that it substantially matches the size of the camera's entrance pupil, said diffuser in combination with said lenses of said adapter operating to enhance the uniformity of the illumination in the camera's viewing path and taking path and to preclude vignetting of the entrance pupil of the camera's viewing system by optically spreading the optical viewing device's exit pupil to match its size with that of the camera's entrance pupil.

2. The adapter of claim 1 further including a beamsplitter mounted in said housing along the optical axis of its said optical elements for providing a folded optical path along which the optical viewing device's field of view may be observed independently of the camera's viewing system.

3. An adapter for use in optically coupling a photographic camera to the proximal end of an optical viewing device such as an endoscope so that the image of an object formed by the optical viewing device can simultaneously be viewed and photographed, the camera being of the type which has a through-the-lens viewing system whose entrance pupil occupies only a portion of the camera's taking entrance pupil and which is laterally offset with respect to the optical axis of the camera's taking lens and the optical viewing device being of the type which has an eyepiece located at its proximal end for forming a collimated to nearly collimated object image and having an exit pupil smaller in size than the entrance pupil of the camera's optical system, said adapter comprising:

a housing adapted to make a mechanical generally light-tight connection between the proximal end of the optical viewing device and the camera's objective taking lens;

a first relay lens, mounted in said housing in position to intercept light rays emerging from the optical viewing device's eye lens, for forming at a predetermined spatial location within said housing an aerial image of the object being viewed by the optical viewing device's optical system;

a second relay lens mounted in said housing at a predetermined spaced distance from said first relay lens and adjacent the camera's objective taking lens for allowing said camera's objective lens to be focused on said aerial image;

a field lens of larger size than the exit pupil of the optical viewing device and positioned in said housing between said first and second relay lenses for forming an image of the optical viewing device's exit pupil as seen through said first relay lens onto the entrance pupil of the camera as seen through said second relay lens, said field lens operating to redirect the chief rays from the bundle of rays forming said aerial image toward the optical axis of said second relay lens so that substantially all of the rays from said aerial image pass through the camera's entrance pupil; and a diffuser located within said housing in the plane in which said aerial image is formed and structured for spreading the optical viewing device's exit pupil so that it substantially matches the size of the camera's entrance pupil when imaged thereon by said field lens, said diffuser in combination with said lenses of said adapter operating to enhance the uniformity of the illumination in the camera's viewing path and taking path and to preclude vignetting of the entrance pupil of the camera's viewing system by optically spreading the optical viewing device's exit pupil to match its size with that of the camera's entrance pupil.

4. The adapter of claim 3 wherein said field lens is positioned on the side of said diffuser facing said first relay lens and immediately adjacent said plane in which said first aerial image is formed.

5. The adapter of claim 3 further including a beamsplitter mounted in said housing along the optical axis of its said optical elements for providing a folded optical path along which the optical viewing device's field of view may be observed independently of the camera's viewing system.

* * * * *